United States Patent
Onodera et al.

(10) Patent No.: US 8,025,930 B2
(45) Date of Patent: Sep. 27, 2011

(54) METHOD FOR FABRICATING METAL-COATED ORGANIC CRYSTAL

(75) Inventors: Tsunenobu Onodera, Miyagi (JP); Hidetoshi Oikawa, Miyagi (JP); Hitoshi Kasai, Miyagi (JP); Hachiro Nakanishi, Miyagi (JP); Takashi Sekiguchi, Ibaraki (JP)

(73) Assignee: Japan Science and Technology Agency, Kawaguchi-shi, Saitama (JP)

( * ) Notice: Subject to any disclaimer, the term of this patent is extended or adjusted under 35 U.S.C. 154(b) by 679 days.

(21) Appl. No.: 12/067,078

(22) PCT Filed: Mar. 10, 2006

(86) PCT No.: PCT/JP2006/304808
§ 371 (c)(1),
(2), (4) Date: May 1, 2008

(87) PCT Pub. No.: WO2007/034583
PCT Pub. Date: Mar. 29, 2007

(65) Prior Publication Data
US 2009/0130329 A1    May 21, 2009

(30) Foreign Application Priority Data

Sep. 20, 2005   (JP) .................................. 2005-272134

(51) Int. Cl.
*B05D 3/00* (2006.01)
(52) U.S. Cl. .......................... 427/553; 427/212; 427/508
(58) Field of Classification Search .................. 427/508, 427/553, 212
See application file for complete search history.

(56) References Cited

U.S. PATENT DOCUMENTS
2004/0195709 A1   10/2004   Nakanishi et al.

FOREIGN PATENT DOCUMENTS

| JP | 51-6135 | 1/1976 |
|----|---------|--------|
| JP | 60-050172 | 3/1985 |
| JP | 60-235791 | 11/1985 |
| JP | 06-079168 | 3/1994 |
| JP | 09-260808 | 10/1997 |
| JP | 2001-262137 A | 9/2001 |
| JP | 2003-084322 | 3/2003 |

OTHER PUBLICATIONS

Katagi et al. "Fabrication of Metal-Coated Organic Microcrystals" Polymers for Advanced Technologies, 11, (2000) pp. 778-782.*

(Continued)

*Primary Examiner* — Dah-Wei Yuan
*Assistant Examiner* — Robert S Walters, Jr.
(74) *Attorney, Agent, or Firm* — Ladas & Parry LLP

(57) ABSTRACT

A method for fabricating metal-coated organic crystal wherein a reaction of an organic crystal with transition metal salt in alkaline aqueous solution under visible light irradiation, wherein, when energy at the top of valence band of the organic crystal is defined as A (eV) and energy at the bottom of conduction band of the organic crystal is defined as B (eV), redox potential C (V) of transition metal ion or transition metal complex ion, when said transition metal salt is dissolved in the alkaline aqueous solution, these three parameters should satisfy the following relation (1):

$$-A-4.5 \geq C \geq -B-4.5. \qquad (1)$$

8 Claims, 1 Drawing Sheet

OTHER PUBLICATIONS

S.J. Oldenburg, et al.; "Nanoengineering of optical resonances", Chemical Physics Letters 288 (1998) pp. 243-247.
Frank Caruso, et al; "Multilayer Assemblies of Silica-Encapsulated Gold Nanoparticles on Decomposable Colloid Templates", Adv. Mater. 2001, 13, No. 14, Jul. 18.
Yoshio Kobayashi, et al; "Deposition of Silver Nanoparticles on Silica Spheres by Pretreatment Steps in Electroless Plating", Chem. Mater, 2001, 13, pp. 1630-1633.
International Search Report: PCT/JP2006/304808.
Hitoshi Kasai, et al; "A Novel Preparation Method of Organic Microcrystals", Jpn. J. Appl. Phys. vol. 31, (1992) pp. L1132-L1134; Part 2, No. 8A, Aug. 1, 1992.
W. Spannring, et al; "Electron Injection Into a Polydiacetylene Crystal (DCH). Determination of Electron Mobility and Energy Level Spectrum", Chemical Physics Letters, Nov. 15, 1981, vol. 84, No. 1, pp. 54-58.
S. Roy Morrison; "Electrochemistry at Semiconductor and Oxidized Metal Electrodes" 1980 Plenum Press (New York, London) p. 31.

* cited by examiner

METHOD FOR FABRICATING METAL-COATED ORGANIC CRYSTAL

TECHNICAL FIELD

The present invention relates to a method for fabricating a metal-coated organic crystal, wherein surface of the organic crystal is coated with a certain metal.

BACKGROUND ART

Metal-coated material obtained by coating metal over the surface of the base material is useful, because the metal gives metal-derived properties such as hardness, electroconductivity, and solvent resistance to the surface of the base material. Therefore, many studies have been made about various materials.

By those studies, various methods to coat metal over the surface of particulate materials are proposed. For example, Non-Patent Document 1 discloses a method to coat gold to $SiO_2$ beads of which surface is modified with silane coupling agent having amino terminals. Non-Patent Document 2 discloses a method by making gold nanoparticles adsorbed on a polystyrene latex to which polyelectrolyte is adsorbed so as to realize reductive extraction of gold by use of the adsorbed polystyrene latex as the foothold. Further, Non-Patent Document 3 discloses a method to coat silver to $SiO_2$ beads by adding silver salt to $SiO_2$ beads on which $Sn^{2+}$ is adsorbed.

Non-Patent Document 1: Chemical Physics Letters, 288 (1998), pp. 243-247

Non-Patent Document 2: Advanced Materials, 13 (2001), pp. 1090-1094

Non-Patent Document 3: Chemistry of Materials, 13 (2001), p. 1630

DISCLOSURE OF THE INVENTION

Problems to be Solved by the Invention

However, in conventional methods for coating particulate materials with metal including the methods described in the above Non-Patent Documents, binders such as silane coupling agent, surfactant, and polyelectrolyte, and/or reducing agent need to be used at a time of coating; there has hardly ever been found such a method to coat metal directly to the materials to be core. If binders and so on are used, by-products co-exist at high concentration, which not only make the process of separation of the by-products complex but also damage properties of the metal-coated materials. In order to make full use of property of metal and materials to be coated by metal, a method to coat metal directly (without coating through binders and the like) to the materials to be core should be required.

Further, in the conventionally studied metal-coated particulate materials, materials to be the core are mostly amorphous polymer, a method to coat organic crystals with metal has not been found. If metal coating over organic crystal like organic colorant and so on having various usages as functional materials is feasible, such coated materials are anticipated to become new materials such as nonlinear optical material and optoelectronic material for the use of various applications. For example, for optical switching, optical operation, and optical memory, which will respectively support the next generation optical communication, excellent nonlinear optical materials are necessitated. However, so far, no suitable material like that could have been found for making devices. So, by coating with metal over the core having nonlinear optical property, optical-electric-field induced by effect of metallic nanoshell may improve the nonlinear optical property.

Accordingly, an object of the present invention is to provide a method for fabricating a metal-coated organic crystal as the new materials.

Means for Solving the Problems

The present inventors have been conducted serious studies in order to solve the problem. As a result, the present inventors have acquired an idea that metal coating to organic crystal is feasible by photocatalytic reduction method using transition metal salt (as a metal source) having a particular physicochemical interaction with the organic crystal.

The present invention provides a method for fabricating metal-coated organic crystal particles comprising a step of reacting organic crystal particles with transition metal salt in alkaline aqueous solution under visible light irradiation without a reducing agent, wherein, when energy at the top of valence band of the organic crystal is defined as A (eV) and energy at the bottom of conduction band of the organic crystal particles is defined as B (eV) and redox potential of transition metal ion or transition metal complex ion derived from the transition metal salt dissolved in the alkaline aqueous solution is defined as C (eV), said A, B and C satisfy the following relation (1):

$$-A-4.5 \geq C \geq -B-4.5 \tag{1}$$

so as to solve the above-mentioned problems.

In this aspect of the invention, the organic crystal is preferably a colorant organic crystal and average diameter of the organic crystal is preferably less than 1 μm.

Moreover, in the above aspect of the invention, the alkaline aqueous solution is preferably ammonia water and the transition metal is preferably selected from a group consisting of gold, silver, copper, cobalt, platinum, and palladium.

Effects of the Invention

According to the fabrication method of the invention, it is capable to provide a method for fabricating metal-coated organic crystal which metal is not adhered to organic crystal through other materials such as binder but is directly adhered over organic crystal. According to the method, as reaction is proceeded by photoexcitation, it is possible to gently proceed the reaction without using reducing agent and so on. Since reducing agent and so on are not used in the reaction, it is also possible to depress the formation of by-products in the reaction system. Further, as the fabrication method of the invention is a method that the materials are only mixed in the alkaline aqueous solution; thereby it is possible to easily and economically fabricate the metal-coated organic crystal.

Such effects and advantages of the inventions will be made apparent from the best mode for carrying out the invention, which will be described as follows.

BEST MODE FOR CARRYING OUT THE INVENTION

Figure 1:
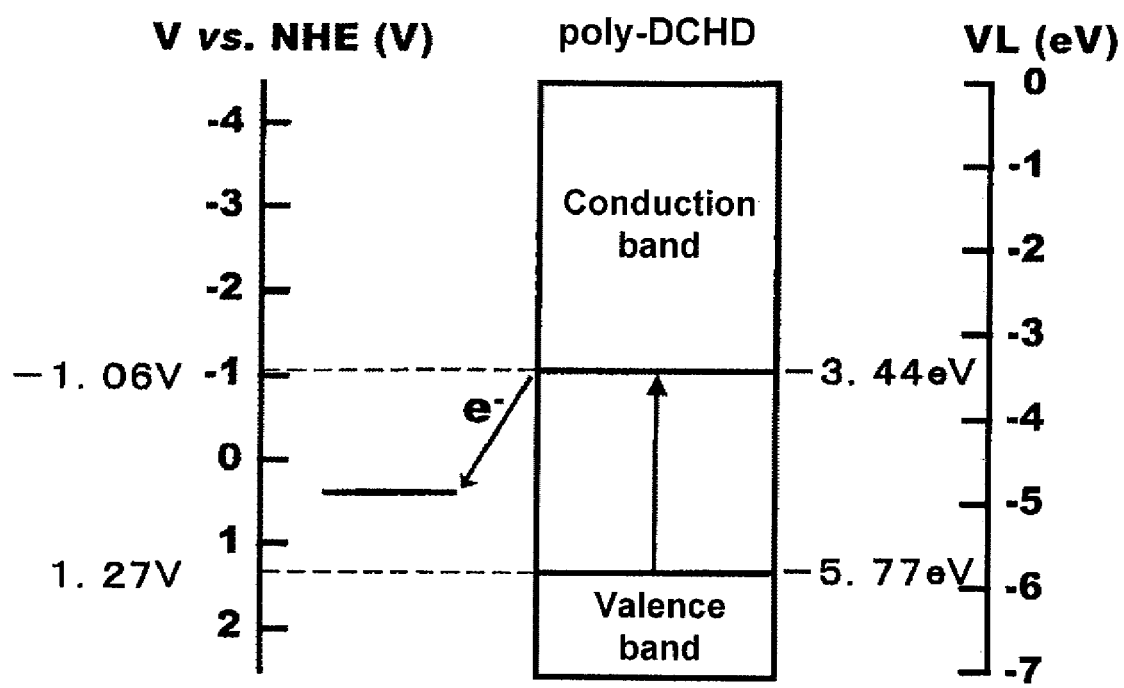
FIG. 1 is the energy level diagram of a case where poly-DCHD is used as an organic crystal.

The method for fabricating metal-coated organic crystal of the present invention is carried out by reaction of an organic crystal with transition metal salt in alkaline aqueous solution.

The organic crystal used in the invention is not specifically limited. Nevertheless, as the reaction in the invention starts by photoexcitation, easily photoexcited colorant organic crystal having absorption within visible range is preferably used. Preferable examples thereof include: polydiacethylene series compounds such as poly-1,6-di (N-carbazolyl)-2,4-hexadiyne (poly-DCHD), poly-5,7-dodecadiyne-1,12-diylbis (N-(butoxy carbonylmethyl) carbamate) (poly-4BCMU), and poly-2,4-hexadiyne-1,6-diyldi (p-toluene sulphonate) (poly-PTS); phthalocyanine compounds such as zinc phthalocyanine, cobalt phthalocyanine, and tetrakis (thiohexyl) vanadyl-phtalocuanine; porphyrin series compounds such as tetraphenyl porphyrin, and zinc tetraphenyl porphynate; 3-carboxymethyl-5-[2-(3-octadecyl-2-benzoselenaxol-nylidene) ethylidene]rhodanine, cyanine derivatives, and so on having J-aggregate forming ability.

Shape and size of the organic crystal are not limited; it is preferably a microcrystal which is capable to react while being dispersed and stirred. Particularly, a nanometer-sized organic nanocrystal (average particle diameter thereof is 1 μm or less) is preferably used. As the fabrication method of the nanometer-sized organic nanocrystal, reprecipitation method, wherein solution obtained by dissolving the organic crystal into a good solvent is injected into a poor solvent under high-speed stirring to precipitate nanocrystal, is preferably used. According to this method, nanocrystal can be obtained in the state of dispersed liquid, by using the nanocrystal dispersed liquid as it is, it is capable to carry out the fabrication method of the present invention continuously after fabrication of organic nanocrystal by reprecipitation method. Detailed description of reprecipitation method may be referred to "Japanese Journal of Applied Physics", 31 (1992), L1132; Japanese Patent Application Laid-Open (JP-A) No. H06-079168; JP-A No. 2001-262137; and so on.

Transition metal salt is dissolved in a form of free transition metal ion or free transition metal complex by being added to alkaline aqueous solution as a reaction solvent as a metal source for coating over the organic crystal. Examples of transition metals constituting the transition metal salt are preferably gold, silver, copper, cobalt, platinum, and palladium. In the invention, nitrate salt thereof, halide salt thereof, sulfate thereof, acetate thereof, trifluoroacetate thereof, perchlorate thereof, and so on are used. In the view of reactivity, silver salt such as silver nitrate is particularly preferable.

The amount of the transition metal salt, depending on the size of organic crystal (if amount of transition metal salt is too small, the metal therein cannot entirely coat over the surface of organic crystal), is usually double or more to the dosage of organic crystal at molar standard. The upper limit of the amount is not particularly limited, which is adequately determined based on the desirable thickness of metal layer to be made on the surface of the organic crystal, cost, and so on.

For the alkaline aqueous solution used as a solvent, aqueous solution of hydroxide salt of alkaline metal or water-soluble amine, and so on are used. Among them, ammonia water is preferable because it is not only easily remove alkaline component from the reaction system after reaction, but also it is suitable for dissolving silver oxide when silver salt is used as a transition metal salt.

The above organic crystal and the transition metal salt, both of which are to become the starting materials of the metal-coated organic crystal, are used only when energy at the top of valence band of the organic crystal is defined as A (eV) and energy at the bottom of conduction band of the organic crystal is defined as B (eV), and redox potential C (V) of transition metal ion or transition metal complex ion, when the transition metal salt is dissolved in the alkaline aqueous solution, these three parameters should satisfy the following relation (1):

$$-A-4.5 \geq V \geq -B-4.5 \quad (1)$$

Redox potential of the transition metal ion or transition metal complex ion is redox potential on the basis of the standard hydrogen electrode; this specification uses values disclosed in "Kagaku Binran Kiso-hen (Chemistry Handbook Basic edition) II 3rd Edition": edited by The Chemical Society of Japan, 1984, pp. 474-476. When transition metal is dissolved in alkaline aqueous solution as the solvent, which ionic species between the free metal ion and complex ion the transition metal is formed is determined by the species of transition metal and the kinds of alkaline aqueous solution. In reality, since these ionic species do not exist as a single species strictly in the solution, in the present invention, the values of redox potential of ionic species to be the main component in the alkaline aqueous solution is used. For instance, when silver nitrate is used as a transition metal salt, if ammonia water is used as an alkaline aqueous solution, silver mainly exists as diammine silver (I) as a complex ion; thereby, redox potential (0.373 (V)) of diammine silver (I) ion is used for C. And, if alkaline aqueous solution is an alkaline hydroxide aqueous solution such as sodium hydroxide aqueous solution, silver mainly exists as free silver ion; thereby redox potential (0.799 (V)) of silver ion is used for C.

Hereinafter, both of transition metal ion and transition metal complex ion are simply referred to as "transition metal ion".

Energy of organic crystal at the bottom of conduction band and energy of the same at the top of valence band respectively means energy difference between energy at the bottom of conduction band and vacuum level, or energy difference between energy at the top of valence band and vacuum level. These can be experimentally measured. There are several experimental methods for measuring the above energy; this invention adopts a method disclosed in "Chemical Physics Letters", 84 (1981), pp. 54-58. In this method, by applying bias voltage for injecting charges from metal to organic crystal and measuring the relations between bias voltage and a current, energy level of the conduction band is determined; then optically estimated band gap is taken away from energy level of the conduction band to estimate the energy level of valance band.

FIG. 1 is the energy level diagram of the case where poly-DCHD is used as an organic crystal. If the combination of organic crystal and transition metal salt, both of which are starting materials of the present invention, could satisfy the above-mentioned relational expression (1), that means redox potential of the transition metal ion exists between energy level at the top of valence band of the organic crystal and energy level at the bottom of conduction band of the same when height of right axis showing energy level of the organic crystal and height of left axis showing redox potential of the transition metal ion are set as shown in FIG. 1. The relation between redox potential and vacuum level is disclosed in "Electrochemistry at Semiconductor and Oxidized Metal Electrodes", (1980): Plenum Press (New York, London), p. 31. By using the combination of starting materials having such the relation, electrons excited from valance band to conduction band in the organic crystal flow to transition metal ion, reductive deposition of transition metal on the surface of organic crystal, in other words, coating with transition metal over the surface of organic crystal, can be possible. As seen from the right axis of FIG. 1, energy level of poly-DCHD at the bottom of conduction band is −3.44 eV, energy level of the same at the top of valence band is −5.77 eV; in this invention, transition metal salt to become transition metal ion having redox potential shown by the left axis corresponding to the energy level at the bottom of conduction band and at the top of valence band, namely, redox potential between −1.06V and 1.27V in the alkaline aqueous solution, may be used as a raw material in combination with poly-DCHD.

Reaction of the organic crystal with the transition metal salt is carried out by stirring thereof under visible light irradiation. The condition of visible light irradiation means the brightness as the same degree as indoor lighting, which enables to proceed the reaction sufficiently. When a crystal which does not absorb within the visible range is used, it is capable to facilitate the reaction by radiating ultraviolet light. The reaction temperature and reaction time are different depending on the starting materials used; it is adequately determined based on the desirable thickness of metal layer to be coated over the organic crystal. In order to enhance the stirring efficiency to facilitate the reaction, ultrasonic waves may be radiated.

When the fabrication method of the invention is carried out by use of nanocrystal made by the reprecipitation method, the reaction may proceed by adding alkaline aqueous solution and transition metal salt into nanocrystal dispersed liquid produced at the time of nanocrystal fabrication, or reaction may also proceed by isolating the nanocrystal once and then re-dispersing the nanocrystal into the alkaline aqueous solution.

The metal-coated organic crystal thus obtained is observed by scanning electron microscope (SEM) which confirms core-shell structure in which the entire surface of the organic crystal (core) is directly coated with innumerable nanometer-sized metal nanoparticles (shell).

The metal-coated organic crystal obtained by the above method can be further modified to a metal-coated organic crystal of which metal of surface coating is substituted by reacting thereof with salt of transition metal of which ionization tendency is lower than the previously-coated metal. This is useful in view of obtaining various kinds of the metal-coated organic crystals having different surface metal with ease from one kind of metal-coated organic crystal.

EXAMPLES

Hereinafter, examples of the present invention will be shown. However, the invention is not limited to these examples.

Example 1

In 50 mL of purified water vigorously-stirred by magnetic stirrer, 1 mL of 5 mM DCHD acetone solution was injected quickly using microsyringe, and the mixed solution was kept undisturbed at 40° C. for 30 minutes to fabricate DCHD nanocrystal. Later, ultraviolet light (265 nm) was irradiated for 60 minutes and solid state polymerization of DCHD nanocrystal was carried out to make poly-DCHD nanocrystal. The average particle diameter of the poly-DCHD nanocrystal was about 150 nm.

Then, in 5 mL of the above poly-DCHD nanocrystal aqueous dispersion, silver nitrate aqueous solution (22.2 mM, 0.5 mL) and ammonia aqueous solution (11 mM, 0.2 mL) were added; the mixed solution was kept at 40° C. for 30 minutes under interior light, metal-coated organic crystal in which innumerable silver nanoparticles were adsorbed on the surface of the poly-DCHD nanocrystal (core) was obtained. When the obtained metal-coated organic crystal was observed by scanning electron microscope (SEM), innumerable silver nanoparticles at about 5~15 nm in diameter were adsorbed on the entire surface of the poly-DCHD nanocrystal. In addition, as a result of powder method X-ray diffraction and electron diffraction measurement, the metal-coated organic crystal was found out that it consists of poly-DCHD and silver only.

Furthermore, when the same operation as that of Example 1 was carried out in a condition of changing the silver nitrate aqueous solution into same concentration of one of silver sulfate ($Ag_2SO_4$), silver acetate ($AgCH_3COO$), silver trifluoroacetate ($AgCF_3COO$), or silver perchlorate ($AgClO_4$), metal-coated colorant organic nanocrystals which were similar type of Example 1 were also obtained.

Example 2

In 20 mL of purified water vigorously-stirred by magnetic stirrer, 0.4 mL of CoPc dimethyl formamide solution was injected quickly using microsyringe to make CoPc nanocrystal. In 5 mL of the above CoPc nanocrystal aqueous dispersion, silver nitrate aqueous solution (22.2 mM, 0.5 mL) and ammonia aqueous solution (111 mM, 0.2 mL) were added; the mixed solution was heated and irradiated by ultrasonic waves for 30 minutes under interior light, a metal-coated organic crystal which innumerable silver nanoparticles were adsorbed on the surface of the CoPc nanocrystal (core) was obtained. When the obtained metal-coated organic crystal was observed by scanning electron microscope (SEM), innumerable silver nanoparticles were adsorbed on the entire surface of the CoPc nanocrystal. In addition, as a result of powder method X-ray diffraction and electron diffraction measurement, the metal-coated organic crystal was found that it consists of CoPc and silver only.

Example 3

In 20 mL of purified water vigorously-stirred by magnetic stirrer, 0.2 mL of saturated tetraphenyl porphyrin ($H_2TPP$) dimethoxyethane solution was injected quickly using microsyringe to make $H_2TPP$ nanocrystal. In 3 mL of the above $H_2TPP$ nanocrystal aqueous dispersion, silver nitrate aqueous solution (22.2 mM, 0.5 mL) and ammonia aqueous solution (111 mM, 0.2 mL) were added; the mixed solution was heated and irradiated by ultrasonic waves for 30 minutes under interior light, a metal-coated organic crystal which innumerable silver nanoparticles were adsorbed on the surface of the $H_2TPP$ nanocrystal (core) was obtained. When the obtained metal-coated organic crystal was observed by scanning electron microscope (SEM), innumerable silver nanoparticles were adsorbed on the entire surface of the $H_2TPP$ nanocrystal. In addition, as a result of powder method X-ray diffraction and electron diffraction measurement, the metal-coated organic crystal was found that it consists of $H_2TPP$ and silver only.

Example 4

In 20 mL of purified water vigorously-stirred by magnetic stirrer, 0.2 mL of saturated zinc tetraphenyl porphyrin (ZnTPP) dimethoxyethane solution was injected quickly using microsyringe to make ZnTPP nanocrystal. In 3 mL of the above ZnTPP nanocrystal aqueous dispersion, silver nitrate aqueous solution (22.2 mM, 0.5 mL) and ammonia aqueous solution (111 mM, 0.2 mL) were added; the mixed solution was heated and irradiated by ultrasonic waves for 30 minutes under interior light, a metal-coated organic crystal which innumerable silver nanoparticles were adsorbed on the surface of the ZnTPP nanocrystal (core) was obtained. When the obtained metal-coated organic crystal was observed by scanning electron microscope (SEM), innumerable silver nanoparticles were adsorbed on the entire surface of the ZnTPP nanocrystal. In addition, as a result of powder method X-ray diffraction and electron diffraction measurement, the metal-coated organic crystal was found that it consists of ZnTPP and silver only.

Example 5

In 30 mL of purified water vigorously-stirred by magnetic stirrer, 0.3 mL of 1 mM tetrakis (thiohexyl) vanadyl-phthalocyanine (VOPcR$_4$) tetrahydrofuran solution was injected quickly using microsyringe to make VOPcR$_4$ nanocrystal. In 3 mL of the above VOPcR$_4$ nanocrystal aqueous dispersion, silver nitrate aqueous solution (22.2 mM, 0.5 mL) and ammonia aqueous solution (111 mM, 0.2 mL) were added; the mixed solution was heated and irradiated by ultrasonic waves for 30 minutes under interior light, a metal-coated organic crystal which innumerable silver nanoparticles were adsorbed on the surface of the nanocrystal (core) was obtained. When the obtained metal-coated organic crystal was observed by scanning electron microscope (SEM), innumerable silver nanoparticles were adsorbed on the entire surface of the VOPcR$_4$ nanocrystal. In addition, as a result of powder method X-ray diffraction and electron diffraction measurement, the metal-coated organic crystal was found that it consists of VOPcR$_4$ and silver only.

The above has described the present invention associated with the most practical and preferred examples thereof. However, the invention is not limited to the examples disclosed in the specification. Thus, the invention can be appropriately varied as long as the variation is not contrary to the subject substance and conception of the invention which can be read out from the claims and the whole contents of the specification. It should be understood that metal-coated organic crystal with such an alternation are included in the technical scope of the invention.

What is claimed is:

1. A method for fabricating metal-coated organic crystal particles comprising a step of reacting organic crystal particles with transition metal salt in alkaline aqueous solution under visible light irradiation without an additional reducing agent outside of said organic crystal particles or photo-activated organic crystal particles, wherein, when energy at the top of valence band of said organic crystal is defined as A (eV) and energy at the bottom of conduction band of said organic crystal particles is defined as B (eV) and redox potential of transition metal ion or transition metal complex ion derived from said transition metal salt dissolved in said alkaline aqueous solution is defined as C (eV), said A, B and C satisfy the following relation (1):

$$-A-4.5 \geq C \geq -B-4.5. \tag{1}$$

2. The method according to claim 1, wherein said organic crystal particles are a colorant organic crystal particles.

3. The method according to claim 1, wherein the average particle diameter of said organic crystal particles is less than 1 μm.

4. The method according to claim 1, wherein said alkaline aqueous solution is ammonia water.

5. The method according to claim 1, wherein transition metal constituting said transition metal ion or said transition metal complex is selected from a group consisting of gold, silver, copper, cobalt, platinum, and palladium.

6. The method according to claim 2, wherein transition metal constituting said transition metal ion or said transition metal complex is selected from a group consisting of gold, silver, copper, cobalt, platinum, and palladium.

7. The method according to claim 3, wherein transition metal constituting said transition metal ion or said transition metal complex is selected from a group consisting of gold, silver, copper, cobalt, platinum, and palladium.

8. The method according to claim 4, wherein transition metal constituting said transition metal ion or said transition metal complex is selected from a group consisting of gold, silver, copper, cobalt, platinum, and palladium.

* * * * *